(12) United States Patent
Agrawal et al.

(10) Patent No.: US 7,366,716 B2
(45) Date of Patent: Apr. 29, 2008

(54) INTEGRATING VERTICAL PARTITIONING INTO PHYSICAL DATABASE DESIGN

(75) Inventors: Sanjay Agrawal, Sammamish, WA (US); Vivek R. Narasayya, Redmond, WA (US); Beverly Yang, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 11/124,021

(22) Filed: May 6, 2005

(65) Prior Publication Data

US 2006/0253473 A1    Nov. 9, 2006

(51) Int. Cl.
G06F 7/00 (2006.01)
G06F 17/30 (2006.01)
(52) U.S. Cl. .............................. 707/3; 707/2
(58) Field of Classification Search ................ 707/100, 707/101, 102, 3, 2
See application file for complete search history.

(56) References Cited

U.S. PATENT DOCUMENTS

| | | | | |
|---|---|---|---|---|
| 5,504,887 | A * | 4/1996 | Malhotra et al. | 707/205 |
| 5,970,495 | A * | 10/1999 | Baru et al. | 707/102 |
| 6,169,983 | B1 * | 1/2001 | Chaudhuri et al. | 707/2 |
| 6,460,045 | B1 * | 10/2002 | Aboulnaga et al. | 707/102 |
| 2003/0158842 | A1 * | 8/2003 | Levy et al. | 707/3 |

OTHER PUBLICATIONS

R. Agrawal, et al., "Fast Algorithms for Mining Association Rules", In Proceedings of the 20th International Conference on Very Large Data Bases, 1994, pp. 487-499, Santiago, Chile.

S. Agrawal, et al., "Automated Selection of Materialized Views and Indexes for SQL Databases", In Proceedings of the 26th International Conference on Very Large Data Bases, Sep. 2000, pp. 496-505, Cairo, Egypt.

A. Ailamaki, et al., "Weaving Relations for Cache Performance", In Proceedings of the 27th International Conference on Very Large Data Bases, Sep. 2001, pp. 169-180, Rome, Italy.

S. Chaudhuri, et al., "An Efficient Cost-Driven Index Selection Tool for Microsoft SQL Server", In Proceedings of the 23rd International Conference on Very Large Data Bases, Aug. 1997, pp. 146-155, Athens, Greece.

S. Chaudhuri, et al., "AutoAdmin 'What-If' Index Analysis Utility", In Proceedings of the 1998 ACM SIGMOD International Conference on Management of Data, 1998, pp. 367-378, Seattle, Washington, U.S.A.

S. Chudhuri, et al., "Index Merging", In Proceedings of the 15th International Conference on Data Engineering, Mar. 23-26, 1999, pp. 296-303, Sydney, Australia.

D. Cornell, et al., "An Effective Approach to Vertical Partitioning for Physical Design of Relational Databases", IEEE Transactions on Software Engineering, Feb. 1990, pp. 248-258, vol. 16, No. 2.

(Continued)

*Primary Examiner*—Jean M. Corrielus
*Assistant Examiner*—Dennis Truong
(74) *Attorney, Agent, or Firm*—Amin, Turocy & Calvin, LLP

(57) ABSTRACT

Systems and methodologies that split a table into a plurality of sub-tables, and vertical partitions. By analyzing an associated work load to determine frequently referenced columns, the subject invention supplies a compromise among various vertical partitioning strategies (e.g., candidate selection for table spilt) via a merging act, such that the table is split optimally for the work load taken as a whole Accordingly, an incoming query can optimally reference only required columns.

20 Claims, 9 Drawing Sheets

OTHER PUBLICATIONS

P. De, et al., "An Integrated Model of Record Segmentation and Access Path Selection for Databases", Information Systems, 1998, pp. 13-30, vol. 13, No. 1.

H. Gupta, et al., "Index Selection for OLAP", In Proceedings of the 13th International Conference on Data Engineering, Apr. 1997, pp. 208-219, Burmingham, U.K.

S. Navathe, et al., "Vertical Partitioning for Database Design: A Graphical Algorithm", In Proceedings of the 1989 ACM SIGMOD International Conference on Management of Data, 1989, pp. 440-450, Portland, Oregon, U.S.A.

Oracle9i Database, accessible at: http://otn.oracle.com/products/oracle9i/index.html, 1 page, Last accessed Jul. 5, 2005.

Gray, et al., "DBGen Synthetic Data Generator for SQL Tables and Text files on Windows Platforms", accessible at: http://research.microsoft.com/~gray/dbgen/, 2 pages, Last accessed Jul. 5, 2005.

OLAP Council APB-1 OLAP Benchmark Release II, Nov. 1998, 24 pages.

S. Papadomanolakis, et al., "AutoPart: Automating Schema Design for Large Scientific Databases Using Data Partitioning", In Proceedings of the 16th International Conference on Scientific and Statistical Database Management, Jun. 21-23, 2004, p. 383-392, Santorini Island, Greece.

R. Ramamurthy, et al., "A Case for Fractured Mirrors", In Proceedings of the 28th International Conference on Very Large Data Bases, Aug. 20-23, 2002, pp. 430-441, Hong Kong, China.

J. Rao, et al., "Automating Physical Database Design in a Parallel Database", In Proceedings of the 2002 ACM SIGMOD International Conference on Management of Data, Jun. 4-6, 2002, pp. 558-569, Madison, Wisconsin, U.S.A.

D. Sacca, et al., "Database Partitioning in a Cluster of Processors", In Proceedings of the 9th International Conference on Very Large Data Bases, ACM Transactions on Database Systems, Mar. 1985, pp. 29-56, vol. 10, No. 1.

T. Stohr, et al., "Multi-Dimensional Database Allocation for Parallel Data Warehouses", In Proceedings of the 26th International Conference on Very Large Data Bases, Sep. 2000, pp. 273-284, Cairo, Egypt.

"TPC Benchmark H", Decision Support, Standard Specification Revision 2.1.0, accessible at http://tpc.org , Last accessed Feb. 28, 2006, 150 pages.

G. Lohman, et al., "DB2 Advisor: An Optimizer Smart Enough to Recommend Its Own Indexes", In Proceedings of the 16th IEEE Conference on Data Engineering, Feb. 2000, pp. 101-110, San Diego, California, U.S.A.

B. Zeller, et al., "Experience Report: Exploiting Advanced Database Optimization Features for Large-Scale SAP R/3 Installations", In Proceedings of the 28th International Conference on Very Large Data Bases, Aug. 2002, pp. 894-905, Hong Kong, China.

D. Zilio, "Physical Database Design Decision Algorithms and Concurrent Reorganization for Parallel Database Systems", Ph.D. Thesis, Department of Computer Science, 1998, 299 pages, University of Toronto, Canada.

D. Zilio, et al., "Partitioning Key Selection for a Shared-Nothing Parallel Database System", IBM Research Report RC 19820 (87739), Nov. 10, 1994, 27 pages, T. J. Watson Research Center, Yorktown Heights, New York, U.S.A.

S. Agrawal, et al., "Integrating Vertical and Horizontal Partitioning into Automated Physical Database Design", In Proceedings of the 2004 ACM SIGMOD International Conference on Management of Data, Jun. 13-18, 2004, pp. 359-370, Paris, France.

* cited by examiner

|     | $Q_1$ | $Q_2$ | $Q_3$ | $Q_4$ | $Q_5$ | $Q_6$ | $Q_7$ | $Q_8$ | $Q_9$ | $Q_{10}$ |
| --- | --- | --- | --- | --- | --- | --- | --- | --- | --- | --- |
| A | 1 | 1 | 1 | 1 | 1 | 1 | 1 | 1 | 1 | 1 |
| B | 1 | 1 | 1 | 0 | 0 | 0 | 0 | 0 | 0 | 0 |
| C | 0 | 1 | 1 | 1 | 1 | 1 | 1 | 1 | 1 | 1 |
| D | 0 | 0 | 1 | 0 | 0 | 0 | 0 | 0 | 0 | 0 |

Fig. 4

| Vertical Partitioning | $Q_1$ | $Q_4$ |
|---|---|---|
| {(A, B, C, D)} | Joins: No<br>Extra Data Scan: Yes | Joins: No<br>Extra Data Scan: Yes |
| {(A, B), (C, D)} | Joins: No<br>Extra Data Scan: No | Joins: Yes<br>Extra Data Scan: Yes |
| {(A, C), (B, D)} | Joins: Yes<br>Extra Data Scan: Yes | Joins: No<br>Extra Data Scan: No |
| {(A), (B), (C), (D)} | Joins: Yes<br>Extra Data Scan: No | Joins: Yes<br>Extra Data Scan: No |

Fig. 6

INTEGRATING VERTICAL PARTITIONING INTO PHYSICAL DATABASE DESIGN

TECHNICAL FIELD

The subject invention relates generally to vertical partitioning of tables, and in particular to a split of a table addressed by a work load, such that the vertical partitioning is optimal to the work load taken as a whole.

BACKGROUND OF THE INVENTION

Increasing advances in computer technology (e.g., microprocessor speed, memory capacity, data transfer bandwidth, software functionality, and the like) have generally contributed to enhanced computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a DataBase Management System (DBMS) can typically manage any form of data including text, images, sound and video, and a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns. In accordance thereto, database and file structures are determined by the software application.

Also, the tables can comprise a set of records, and a record includes a set of fields. Records are commonly indexed as rows within a table and the record fields are typically indexed as columns, such that a row/column pair of indices can reference a particular datum within a table. For example, a row can store a complete data record relating to a sales transaction, a person, or a project. Likewise, columns of the table can define discrete portions of the rows that have the same general data format, wherein the columns can define fields of the records.

Queries for such tables can be constructed in accordance to a standard query language (e.g., structured query language (SQL)) in order to access content of a table in the database. Likewise, data can be input (e.g., imported) into the table via an external source. Moreover, Database application designers can typically model the world using data modeling languages, such as the Entity Relationship Model, and the Unified Data Model Language (UML), for example.

Typically, a work load can include a plurality of queries. Such queries can take significant time to be performed on an entirety of a table. Accordingly, vertical partitioning, which enables splitting of the table into two or more tables (e.g., sub-tables), plays an important role in various aspects of physical design in a relational database system, and can significantly impact performance. For example, since many queries in general access only a small subset of the columns in a table, vertical partitioning can reduce the amount of data that needs to be scanned to answer the query.

At the same time, incorporating partitioning further complicates the problem of automating physical design, since the choices of partitioning can strongly interact with choices of indexes and materialized views. Moreover, a large new space of physical design alternatives should typically be considered—for example, each table can be vertically partitioned in many different ways. Similarly, for each index or materialized view that can be considered, a plurality of variations can exist for that structure, each partitioned in a different manner.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods of vertically partitioning a table (T) into a plurality of sub-tables by analyzing an associated work load to determine frequently referenced columns, and supply a compromise among various vertical partitioning strategies (e.g., candidate selection for table spilt) via a merging act, such that the table is split optimally for the work load taken as a whole. Accordingly, an incoming query can optimally reference only required columns. Moreover, it is assumed that each sub-table contains disjoint set of columns of T, except for key columns of T which are present in each sub-table.

According to further aspect of the subject invention, the merging act can be employed to identify new vertical partitioning that are beneficial (e.g., optimize the workload) across queries in the workload. In general, a vertical partitioning that is best for one query may significantly degrade the performance of another query. A vertical partition is a set of sub-tables, wherein each sub-table can include a group of columns being referred to as a column-group. Moreover, since each vertical partition itself is a set of column-groups (e.g., sub-tables), merging two vertical partitioning can require a merge of two sets of column-groups.

In a related aspect of the subject invention, a measure of effectiveness of a column-group for vertical partitioning can be employed to facilitate optimal table split up for a given work load. A vertical partitioning confidence (VPC) can be defined as:

$$\frac{\sum_{c \in g} \text{width}(c) \cdot |\text{Occurrence}(c)|}{\sum_{c \in g} \text{width}(c) \cdot \left| \bigcup_{c \in g} \text{Occurrence}(c) \right|}$$

wherein c is a column belonging to column-group g, width c is the average width in bytes of c, and Occurrence (c) is the set of queries in the work load where c is referenced.

In accordance with an exemplary methodology of the subject invention, for each query, interesting column-groups—(e.g., a column-group with a defined physical design structure that can impact a predetermined fraction of the total cost of the work load)—are initially selected, and subsequently ranked based on the VPC. Such ranking is then employed to recommend a vertical partitioning of the table, and generate relevant physical structure on a per query basis. Put differently, for each query the associated interesting column groups can be determined per table, and ranked by the VPC to propose the vertical partitions for the query. The VPC is applied to all interesting column-groups that contain all the columns referenced in the query, and the top k ranked (where k is an integer) by the VPC are then considered as partitioning strategies. Each vertical partitioning considered can have a sub-table that corresponds to one such column-group. The remaining columns in the table can form the second sub-table of the vertical partition. As such, every vertical partition generated includes two sub-tables.

In yet a further aspect of the subject invention, a methodology for merging two vertical partitions of a given table can measure an impact of merging on the workload in terms of joins and redundant data scans. A space of sub-tables over which the merged vertical partition can be defined, is restricted to those that can be generated via union or intersection of sub-tables in the parent vertical partitioning. Such union operation can decrease the number of joins required (and hence reduce join cost) to answer one or more queries, while intersection can decrease the amount of data scanned (and thereby decrease scan costs) in answering a query. Moreover, the compliment of sub-tables that are present as the final output must be a valid vertical partition, e.g., all the columns of table must occur in some sub-table. Accordingly, whenever a column-group occurs in a single sub-table in both parents, it is guaranteed to be in the same sub-table in the merged vertical partitioning as well.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 4 illustrates a chart that designates a work load of queries operating on a table, which requires a vertical partitioning in accordance with an aspect of the subject invention.

FIG. 6 illustrates an example of vertical partitioning in accordance with an exemplary aspect of the subject invention.

DETAILED DESCRIPTION OF THE INVENTION

Figure 1:
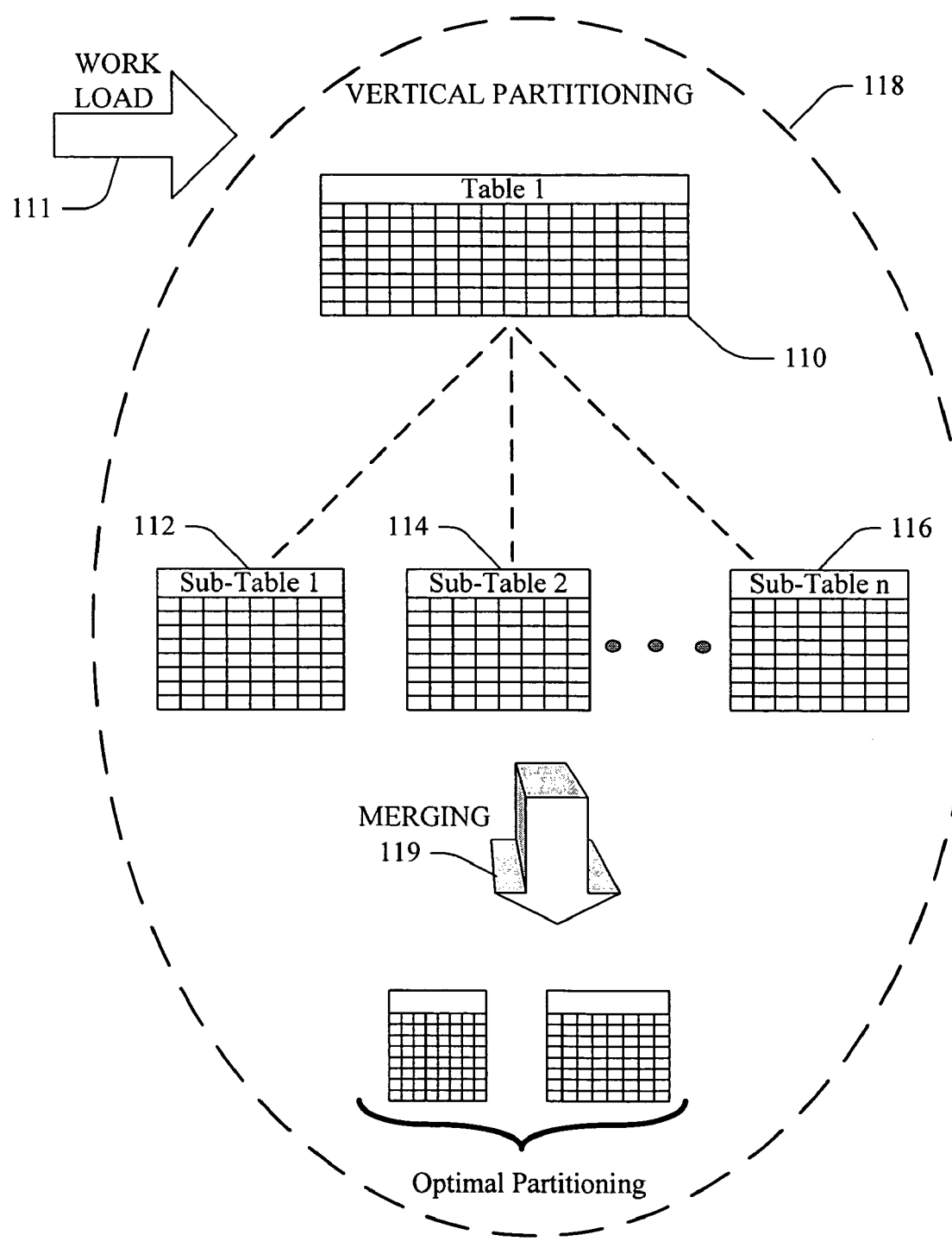
FIG. 1 illustrates a schematic diagram of a table split in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The subject invention provides for systems and methods of vertical partitioning to enable a table to be partitioned into disjoint sets of sub-tables (except for key columns) for an optimal execution of a work load. Accordingly, an incoming query can optimally reference only required columns. Referring initially to FIG. 1, there is illustrated a vertical partitioning 118 for table 110 in accordance with an aspect of the subject invention. Accordingly, table 110 can be split into a plurality of vertical slices 1 to N (where N is an integer) 112, 114, and 116, to optimize execution of the work load 111. The work load 111 can typically be a set of structured query language (SQL) statements and Data Manipulation Language (DML) statements, such as SELECT, INSERT, and UPDATE statements, and the like. A weight $f_Q$ can also be associated with each statement in the work load 111. Such weight can capture the multiplicity of an associated statement in the work load 111.

In many cases, the work load 111 consumed by an application (not shown) can be gathered using mechanisms in modern Data Base Management Systems (DBMS) that allow recording of SQL statements that execute on a server (not shown). In order to capture a representative collection of statements that execute against the system, the user of the application, such as a database administrator—could collect as the workload a log of SQL statements over a sufficiently large window of time (e.g., a day or a week). Consequently, work load 111 tends to be large in size. Moreover, applications often perform detailed analysis of queries in the workload 111 and their interrelationships, and hence an associated running time can be affected significantly as the workload size increases. The vertical partitioning 118 of the subject invention can optimize the performance of a database (not shown) for the given work load 111. In addition, the invention can restrict a search for the best physical design for a work load to objects that are beneficial for at least one query in the work load, as performed in a candidate selection act described in detail infra, and additional objects that are potentially beneficial for the workload 111 as a whole, but not necessarily for individual queries—as discussed in detail infra during the merging act 119.

As illustrated in FIG. 1, the vertical partitioning 118 can split the table 110 into a plurality of sub-tables 112, 114 and 116 each of which can contain a sub set of the columns of table 110. Since many queries of the work load 111 access only a small subset of the columns in the table 110, the vertical partitioning 118 can reduce amount of data that needs to be scanned to answer a query associated with the work load 111. The queries/updates in the workload 111 that reference the table 110 can be rewritten to execute against the sub-tables. Thus, vertical partitioning in accordance with the subject invention can also be viewed as a restricted form of tuning the logical schema of the database to optimize performance. It is to be appreciated that other access paths such as indexes and materialized views can be created over sub-tables to further improve query performance. As described in detail infra, the merging act 119 augments the set of candidates with additional merged physical data structures.

In general, a vertical partitioning that is best for one query may significantly degrade the performance of another query. A vertical partition is a set of sub-tables, wherein each sub-table can include a group of columns being referred to as a column-group. Moreover, since each vertical partition itself is a set of column-groups (e.g., sub-tables), merging two vertical partitioning can require a merge of two sets of column-groups. Accordingly, existence of potentially "over-specialized" physical design structures that are beneficial for individual queries, but not good for the overall workload 111 can be mitigated, and an optimal vertical partition 119 selected.

Figure 2:
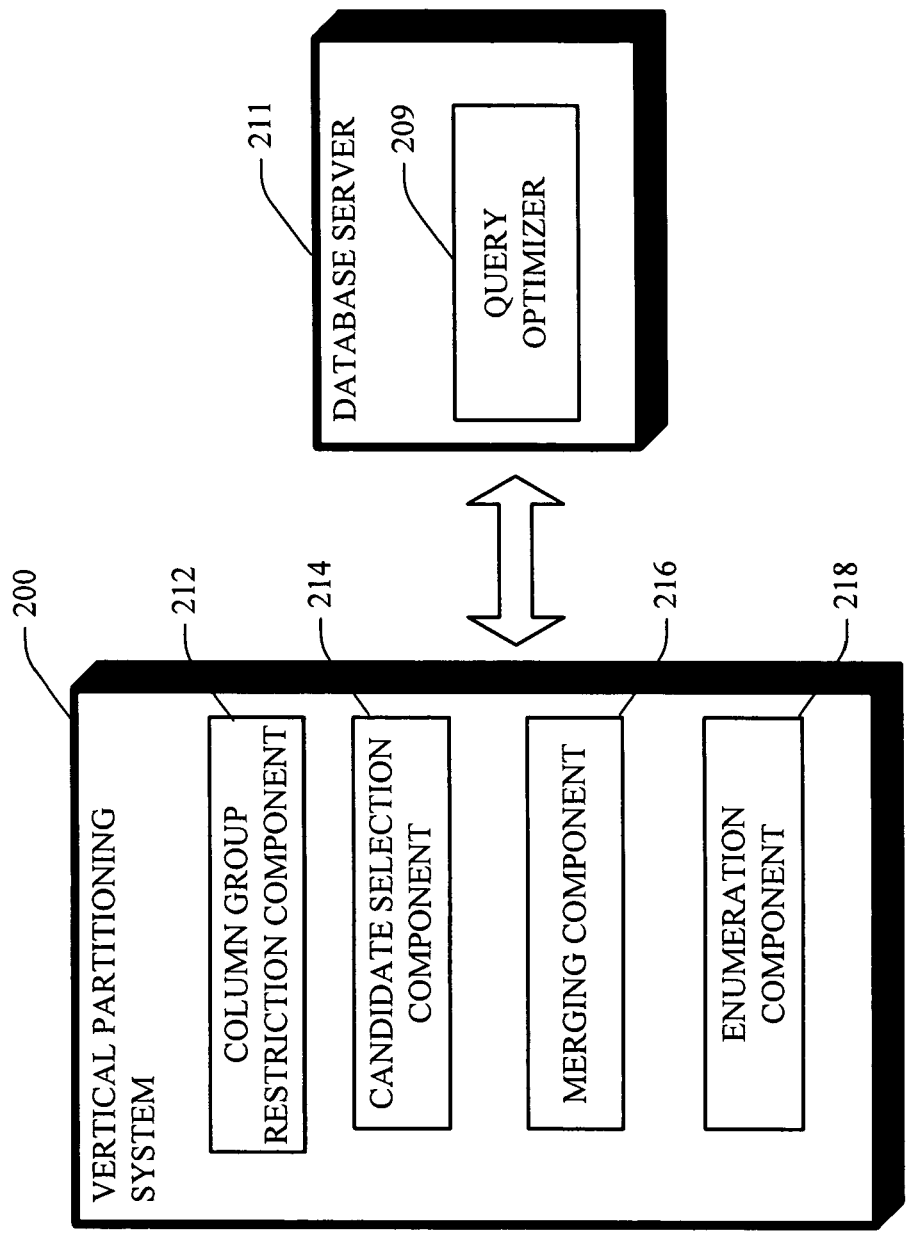
FIG. 2 illustrates a block diagram of a system that vertically partitions tables in accordance with an aspect of the subject invention.

FIG. 2 illustrates a block diagram of a vertical partitioning system 200 in accordance with an aspect of the subject invention. The vertical partitioning system 200 includes a column-group restriction component 212. Such column-group restriction component 212 can eliminate from consideration a large number of column-groups that can at best have only a marginal impact on the quality of the final solution. The column-group restriction component 212 can further identify a group of interesting columns, which are a column-group with a defined physical design structure that can impact a predetermined fraction of the total cost of the work load. An output of such component 212 is a group of interesting columns, for example a column-group with a defined physical design structure that can impact a predetermined fraction of the total cost of the work load.

The candidate selection component 214 can select for each query in the workload (e.g., one query at a time), a set of configurations for that query in a cost-based manner by consulting the query optimizer 209 of the database server 211. In general, a configuration is a valid set of physical design structures, e.g., a set of physical design structures that can be realized in a database. Examples of validity constraints that apply to any given configuration can include: a table can be vertically partitioned in exactly one way, a (sub-) table can have at most one clustered index, and the like. Also, a physical design structure, which is part of the selected configurations of one or more queries of a work load, can typically be referred to as a candidate. (A physical design structure can be an object and its associated partitioning method, wherein a design structure is denoted by (O, P, C), O is an object such as heap, index, materialized view, P is a partitioning method and C is the ordered set of columns of O on which P is applied.) In general a greedily (m, k) algorithm can guarantee an optimal answer when choosing up to m physical design structures, and subsequently employs a greedy strategy to add more (up to k) structures—(where m, k are integers.)

The merging component 216 augments the set of candidates with additional merged physical data structures. In addition, the enumeration component 218 takes as inputs the candidates (including the merged candidates) and produces the final solution, which is a physical database design. Accordingly, a scenario wherein over-specialized physical structures that are beneficial for individual queries, at the expense of the overall work load can be mitigated.

Figure 3:
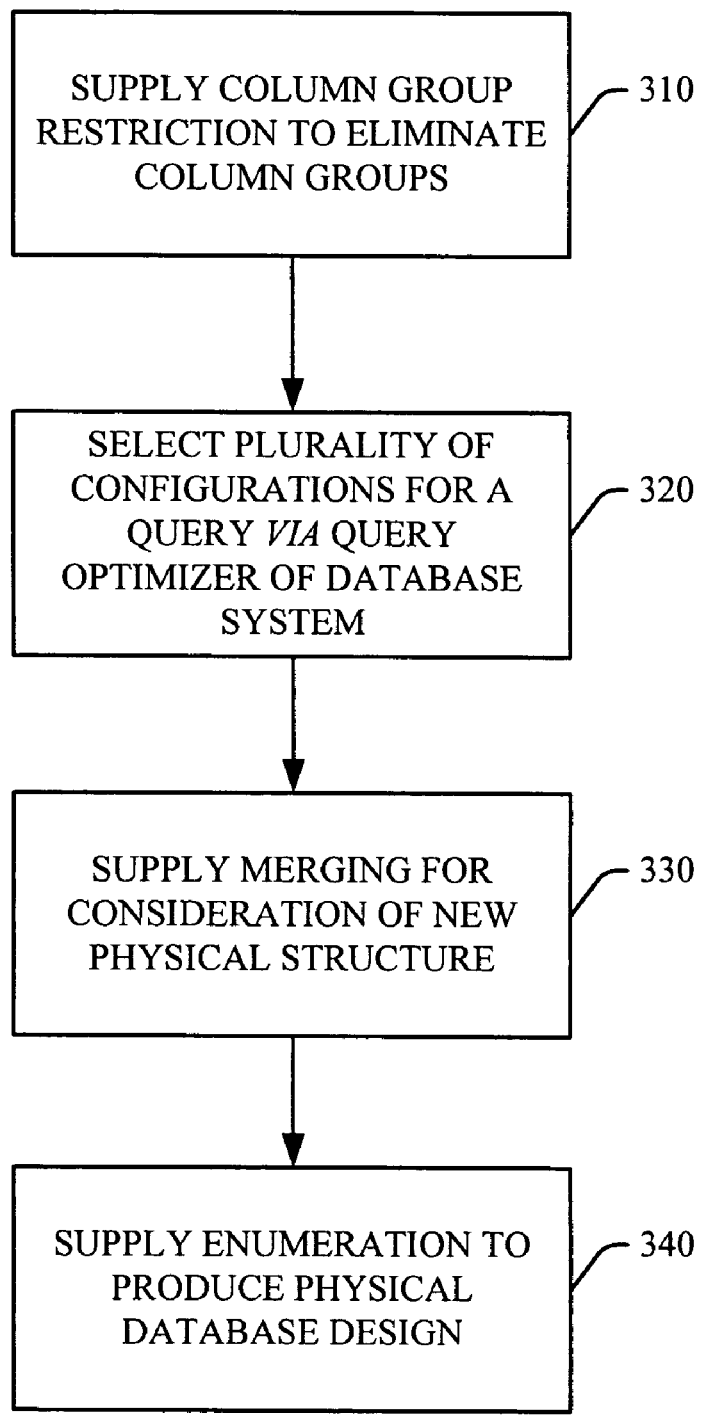
FIG. 3 illustrates a flow chart of facilitating a vertical partitioning in accordance with an exemplary aspect of the subject invention.

Referring now to FIG. 3, a methodology in accordance with an aspect of the subject invention is illustrated. While the exemplary method is illustrated and described herein as a series of blocks representative of various events and/or acts, the subject invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the subject invention. Moreover, it will be appreciated that the exemplary method and other methods according to the invention may be implemented in association with the method illustrated and described herein, as well as in association with other systems and apparatus not illustrated or described. Initially, and at 310, an elimination of a plurality of column-groups occurs via a column-group restriction, to produce a set of interesting column-groups. Next, and at 320 a set of configurations can be selected in a cost-based manner for a query by consulting the query optimizer of the database system. For example, a greedy algorithm can guarantee an optimal answer when choosing up to m physical design structures (where m is an integer that represents the maximum number objects in a query), and subsequently employing a greedy strategy to add more (up to k, where k is an integer) structures Next and at 330 a merging act can consider new physical design structures, based on candidates chosen in the candidate selection act. Subsequently, and at 340 an enumeration act can take as input the candidates (including the merged candidates) to produce a final solution as a physical database design.

Typically, a column-group can be considered as interesting for a work load W, if a physical design structure defined on that column-group can substantially impact a fraction of the total cost of the work load W. For a given column-group g a metric CG–Cost (g) can be defined that defines how interesting that column-group is for the work load. Such CG–Cost (g) can be defined as the fraction of the cost of all queries in the work load where column-group g is referenced. The cost of query can either be the observed execution cost of the query against the current database, (if such information is available) or the cost estimated by the query optimizer. A column-group g is interesting if CG–Cost(g) $\geq f$, where $0 \leq f \leq 1$ is a pre-determined threshold.

For example, FIG. 4 illustrates a work load of queries/updates $Q_1, Q_2, \ldots Q_{10}$, that reference table T (A, B, C, D). A cell in the matrix 400 contains 1, if the query references that column, and otherwise reflects 0. Assuming that all queries have cost of 1 unit, and a specified threshold f=0.2. Then the interesting column-groups for the work load are {A}, {B}, {C}, {A, B}, {A,C}, {B, C} and {A, B, C} with respective CG–Cost of 1.0, 0.3, 0.9, 0.3, 0.9, 0.2, 0.2.

Accordingly, for $Q_3$ the physical structure can be considered on such seven columns, rather than the fifteen column-groups that are syntactically relevant for $Q_3$, since $\{D\}$ and all column-groups containing D are not interesting.

It is to be appreciated that CG–Cost is monotonic, and for column-groups $g_1$ and $g_2$, $g_1 \subset g_2 \Rightarrow$ CG–Cost$(g_1) \geq$ CG–Cost$(g_2)$. As such, for all queries that $g_2$ is referenced $g_1$ is referenced, as are all other subsets of $g_2$. Such monotonicity property can be leveraged to build a set of all interesting column-groups of a workload in a scalable manner, (e.g., by leveraging existing algorithms for frequent-item set generation—rather than having to enumerate all subsets of columns referenced in the workload. As such, an exemplary algorithm for finding interesting column-groups in the workload for a given table T can include:

```
1.  Let G₁ = {g| g is a column-group on table T of cardinality 1, and
    column c ∈ g is referenced in the workload and
    CG – Cost(g) ≥ f };
    i=1
2.  While i<T.NumberRefColumns and |G_i| > 0
3.  i=i+1; G_i={ }
4.  Let G = {g| g is a column-group on table T of size i, and
    ∀s ⊂ g,|s| = i – 1,s ∈ G_{i-1}}
5.  For each g ∈ G
6.  If CG – Cost(g) ≥ f Then G_i = G_i ∪ {g}
7.  End For
8.  End While
9.  Return {G₁ ∪ G₂ ∪ ... G_{T.NumRefColumns}}
```

In a related aspect of the subject invention, a measure of effectiveness of a column-group for vertical partitioning can be employed to facilitate optimal table split up for a given work load. A vertical partitioning confidence (VPC) can be defined as:

$$\frac{\sum c \in g \text{ width } (c) \cdot |\text{Occurrence } (c)|}{\sum c \in g \text{ width } (c) \cdot \left|\bigcup_{c \in g} \text{Occurrence } (c)\right|}$$

wherein c is a column belonging to column-group g, width c is the average width in bytes of c, and Occurrence (c) is the set of queries in the work load where c is referenced. Such a measure can be employed, for example, to filter or rank interesting column-groups, as described in detail supra.

As such, for the example illustrated in FIG. 4 for Query $Q_1$ the set of columns referenced is $\{A, B\}$. It is to be appreciated that the interesting column-groups that could be considered for vertical partitioning for $Q_1$ are $\{A, B\}$ and $\{A, B, C\}$, since both such column-groups contain all columns referenced in $Q_1$. Assuming that all columns are of equal width, then the VPC $(\{A, B\})$=13/20=0.65, whereas the VPC$\{A, B, C\}$=22/30=0.73. Thus using such VPC measure, vertical partitioning on $\{A, B, C\}$ is preferred over $\{A, B\}$.

Moreover, it is to be appreciated that the VPC is a fraction between 0 and 1. An intuitive interpretation of VPC(g) can be that if a vertical partition on g were defined, VPC(g) is the fraction of scanned data would actually be beneficial in answering queries where one or more columns in g are referenced. As such, column-groups with high VPC are more interesting. Additionally, the definition can be extended to incorporate cost of queries by replacing Occurrence(c) with total cost of all queries in Occurrence(c).

Figure 5:
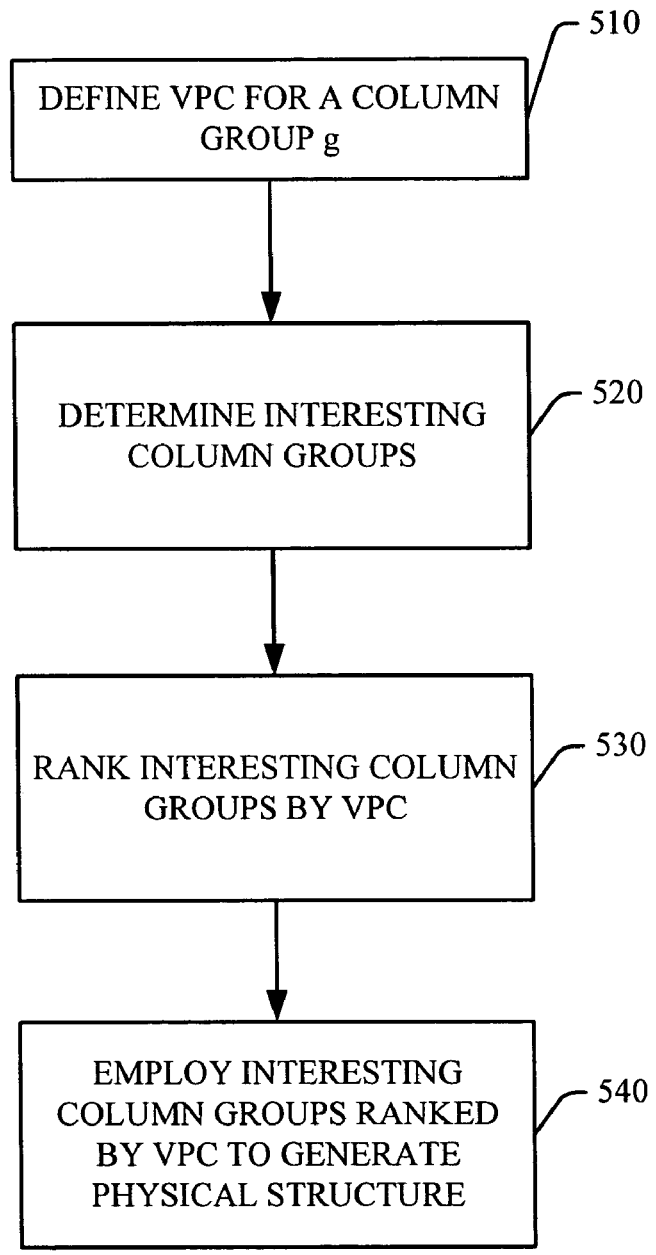
FIG. 5 illustrates a flow chart of determining interesting column-groups in a work load, according to a particular aspect of the subject invention.

FIG. 5 illustrates another exemplary methodology according to the subject invention. Initially and at 510, a VPC for a column-group g is defined. Next and at 520, interesting column-groups (e.g., a column-group with a defined physical design structure that can impact a predetermined fraction of the total cost of the work load) can be determined. Subsequently, such interesting column groups can be ranked by the VPC at 530. Next and at 540, the interesting column-groups that are ranked by the VPC are employed to generate relevant physical structure on a per query basis.

As explained supra, a vertical partitioning that is best for one query, may in fact significantly degrade the performance of another query. A vertical partition is a set of sub-tables, wherein each sub-table can include a group of columns being referred to as a column-group. Moreover, since each vertical partition itself is a set of column-groups (e.g., sub-tables), merging two vertical partitioning can require a merge of two sets of column-groups.

For example, referring to FIGS. 4 and 6, and considering table T(A, B, C, D) and two vertical partitioning of T, $VP_1=\{(A, B, C), (D)\}$ and $VP_2=\{(A, B), (C), (D)\}$ or $\{(A, C), (B, D)\}$, the impact of few vertical alternatives on two queries $Q_1$ and $Q_4$ is illustrated. For $Q_1$ that references only columns A and B, $\{(A, B), (C, D)\}$ is the best among these as no join is typically needed and no redundant data is scanned, and $Q_1$ is answered using (A, B) only. Yet, the same vertical partitioning is inferior for $Q_4$ that references only columns A and C as now both (A, B) and (C, D) needs to be scanned and joined to get required columns. Accordingly, as a consequence of merging vertical partitions, some queries can become more expensive due to more joins that need to be done or more redundant data that needs to be scanned. Thus, if the vertical partition is for the entire table itself, optimal join characteristics can result at the expense of redundant data scan. Likewise, if a table is completely partitioned, e.g., each column forms separate partition, a plurality of joins with no redundant data scan can be obtained.

For example, an particular methodology for merging a pair of vertical partitioning can include the acts of:

Input: Two vertical partitioning of $VP_1=\{t_{11}, t_{12}, \ldots t_{1n}\}$, $VP_2=\{t_{21}, t_{22}, \ldots t_{2n}\}$ for a given table T. $T_n$ is the set of all columns in T.

Function: Queries (VP) over a vertical partition VP returns all queries for which VP was a candidate.

Function: Cost (VP,W) returns cost of vertical partition VP for set of queries W.

Output: A merged vertical partitioning.

```
1.  S={ }//S is a set of sub-tables on T.
2.  For i=1 to n
      For j=1 to m
        S=S ∪ {t_{1i} ∪ t_{2j}} ∪ {T_s – (t_{1i} ∪ t_{2j})}
        S=S ∪ {t_{1i} ∩ t_{2j}} ∪ {T_s – (t_{1i} ∩ t_{2j})}
      End For
    End For
3.  W=QUERIES (VP₁) ∪ QUERIES (VP₂)
4.  For all subsets VP of S that form valid vertical partitioning of T,
    return the VP with the minimal cost O over w.
```

Such algorithm can measure the impact of merging on the work load in terms of joins and redundant data scans. As explained earlier, the space of sub-tables over which the merged vertical partition is defined, can be restricted to those that can be generated via union or intersection of sub-tables in the parent vertical partitionings. Such union operation can decrease the number of joins required (and reduce join cost) to answer one or more queries, while intersection can decrease the amount of data scanned (and thereby decrease scan cost) in answering a query. Moreover, such methodology typically requires complement of sub-tables to be present as the final output must be a valid vertical partition, e.g., all the columns of table must occur in some sub-table. Accordingly, whenever a column-group occurs in a single sub-table in both parents, it can be typically guaranteed to be in the same sub-table in the merged vertical partition. For example, if the parents are $VP_1=\{(A, B), (C, D)\}$ and $VP_2=\{(A, B, C), D)\}$ then it is guaranteed that the column-group (A, B) will typically not be split across different sub-tables.

Also, while in principle COST(VP, W) can employ the optimizer estimated cost, a simpler cost model that is computationally efficient and can be designed to capture the above trade-off in join and scan costs can be employed. For example, the COST (VP, W) for a vertical partition VP and workload W can be defined as the sum of scan cost of data and join cost for all queries $q \epsilon W$. The join cost can be modeled as linear function of individual sub-tables that are joined. The act labeled by numeral 3 above defines the set of queries over which a cost can be determined for the generated vertical partitions to be candidates of either the parents. The act labeled by numeral 4 supplies an enumeration for the space of valid vertical partitions defined by sub-tables above and returns the one with the least cost. It is to be appreciated that the candidate indexes on $VP_1$ and $VP_2$ can also be candidates on the merged vertical partitioning—an exception being indexes whose columns appears in different sub-tables in the merged vertical partitioning.

Figure 7:
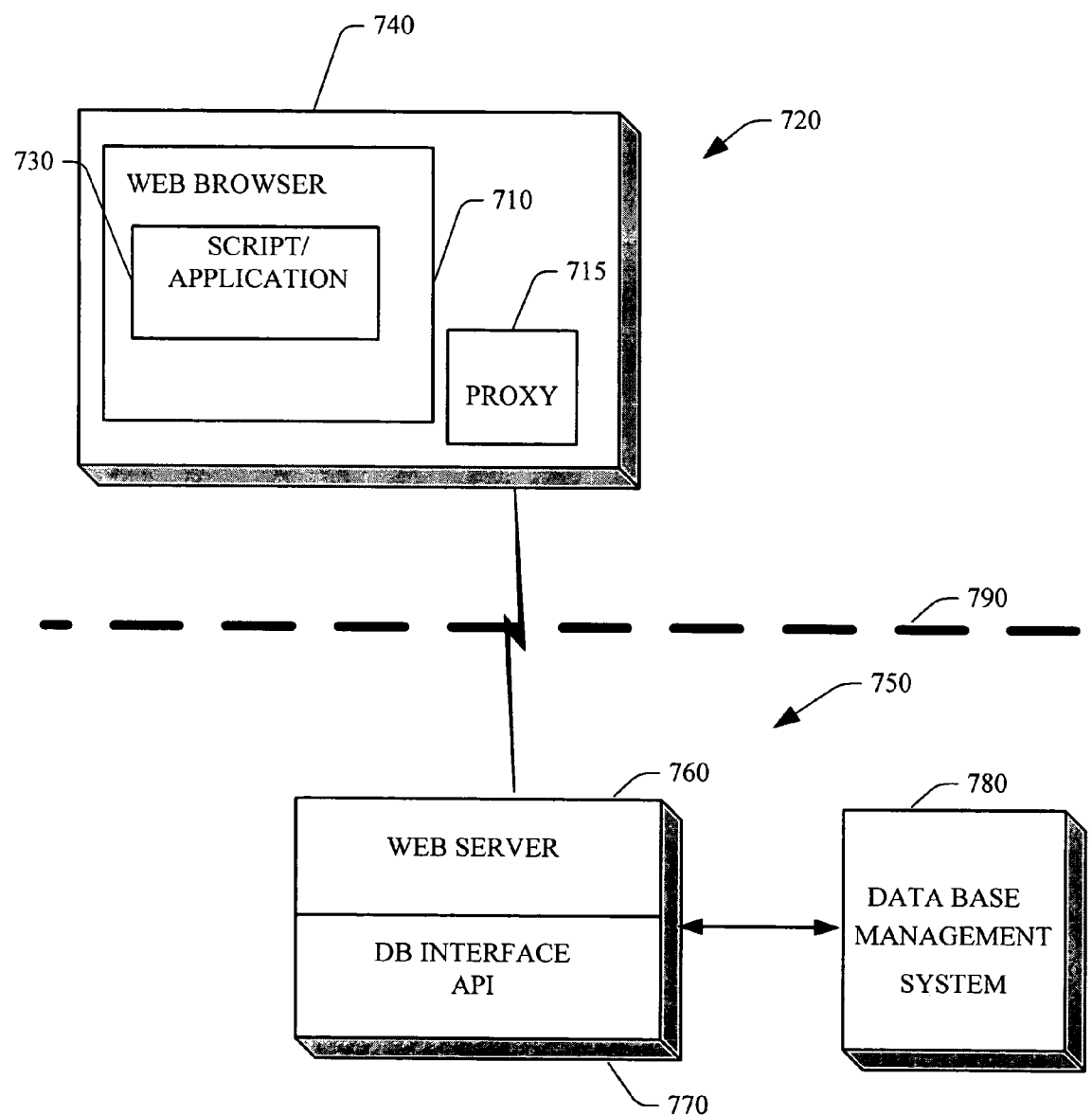
FIG. 7 illustrates a block diagram of a client server that can employ a vertical partitioning in accordance with an aspect of the subject invention.

FIG. 7 illustrates a client-server arrangement that can employ a vertical partitioning arrangement according to an aspect of the invention, wherein running on the client 720 is a client process, for example, a web browser 710. Likewise, running on the server 750 is a corresponding server process, for example, a web server 760. In addition, embedded in the Web Browser 710 can be a script or application 730, and running within the run-time environment 740 of the client computer 720, can exist a proxy 715 for packaging and unpacking data packets formatted in accordance with various aspects of the invention. Communicating with the server 750 is a database management system (DBMS) 780, which manages access to a database (not shown). The DBMS 780 and the database (not shown) can be located in the server itself, or can be located remotely on a remote database server (not shown). Running on the Web server 760 is a database interface Applications Programming Interface (API) 770, which provides access to the DBMS 780. The client computer 720 and the server computer 750 can communicate with each other through a network 790. When the client process, e.g., the Web browser 710, requests data from a database, the script or application 730 issues a query, which is sent across the network (e.g. internet) 790 to the server computer 750, where it is interpreted by the server process, e.g., the Web server 760. The client's 720 request to server 750 can contain multiple commands, and a response from server 750 can return a plurality of result sets. Responses to client commands that are returned can be self-describing, and record oriented; (e.g. the data streams can describe names, types and optional descriptions of rows being returned.)

Figure 8:
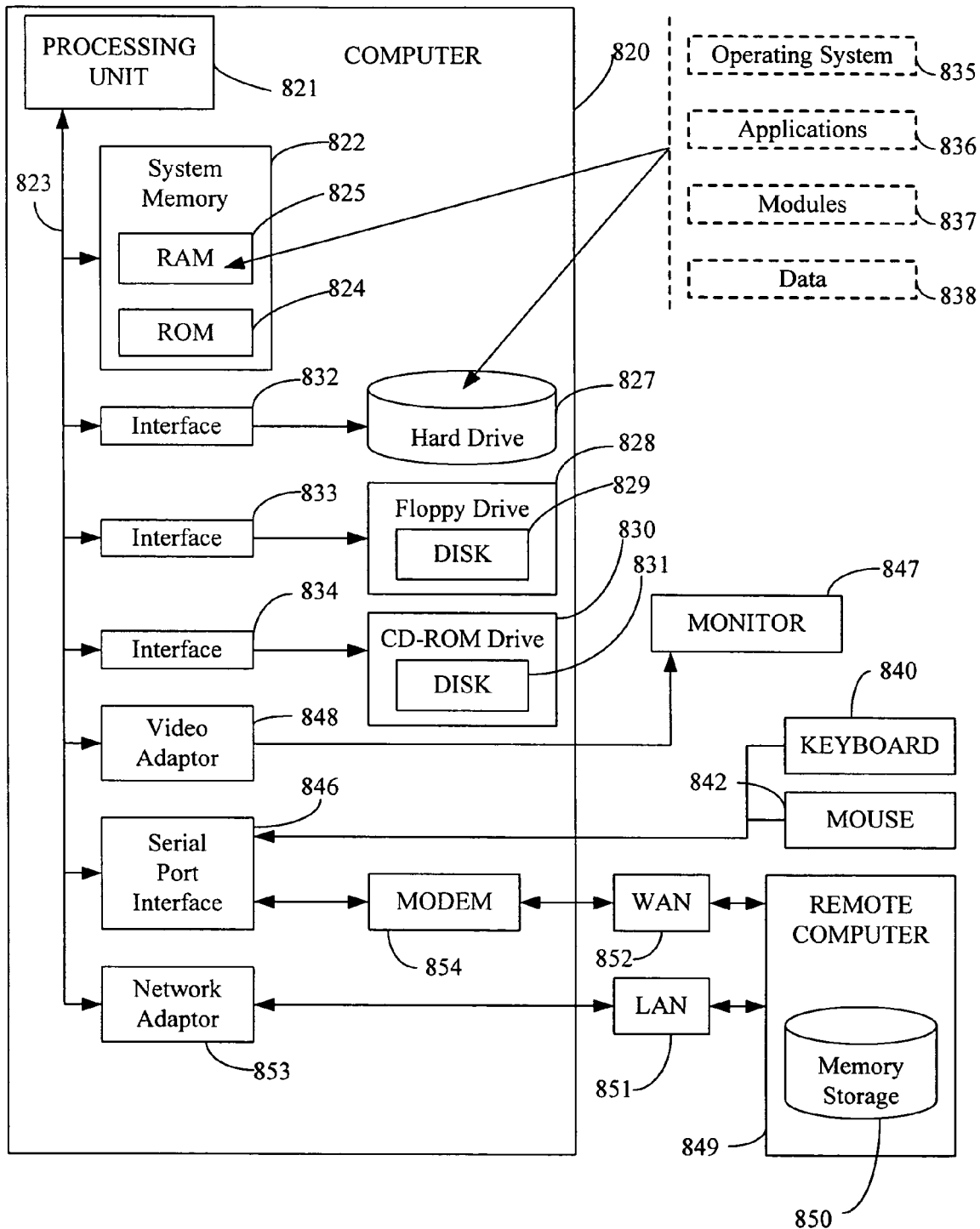
FIG. 8 illustrates a brief, general description of a suitable computing environment wherein the various aspects of the subject invention can be implemented.

Referring now to FIG. 8, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 820, including a processing unit 821, a system memory 822, and a system bus 823 that couples various system components including the system memory to the processing unit 821. The processing unit 821 can be any of various commercially available processors. Dual microprocessors and other multi-processor architectures also can be used as the processing unit 821.

The system bus can be any of several types of bus structure including a USB, 1394, a peripheral bus, and a local bus using any of a variety of commercially available bus architectures. The system memory may include read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading from or writing to a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 825, including an operating system 835, one or more application programs 836, other program modules 837, and program data 838. The operating system 835 in the illustrated computer can be substantially any commercially available operating system.

A user can enter commands and information into the computer 820 through a keyboard 840 and a pointing device, such as a mouse 842. Other input devices (not shown) can include a microphone, a joystick, a game pad, a satellite dish, a scanner, or the like. These and other input devices are often connected to the processing unit 821 through a serial port interface 846 that is coupled to the system bus, but may be connected by other interfaces, such as a parallel port, a game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 can operate in a networked environment using logical connections to one or more remote computers, such as a remote computer 849. The remote computer 849 may be a workstation, a server computer, a router, a peer device or other common network node, and typically includes many or all of the elements described relative to the computer 820, although only a memory storage device 850 is illustrated in FIG. 8. The logical connections depicted in FIG. 8 may include a local area network (LAN) 851 and a wide area network (WAN) 852. Such networking environments are commonplace in offices, enterprise-wide computer networks, Intranets and the Internet.

When employed in a LAN networking environment, the computer 820 can be connected to the local network 851 through a network interface or adapter 853. When utilized in a WAN networking environment, the computer 820 generally can include a modem 854, and/or is connected to a communications server on the LAN, and/or has other means for establishing communications over the wide area network 852, such as the Internet. The modem 854, which can be internal or external, can be connected to the system bus 823 via the serial port interface 846. In a networked environment, program modules depicted relative to the computer 820, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 820, unless otherwise indicated. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations wherein such data bits are maintained are physical locations that have particular electrical, magnetic, or optical properties corresponding to the data bits.

Figure 9:
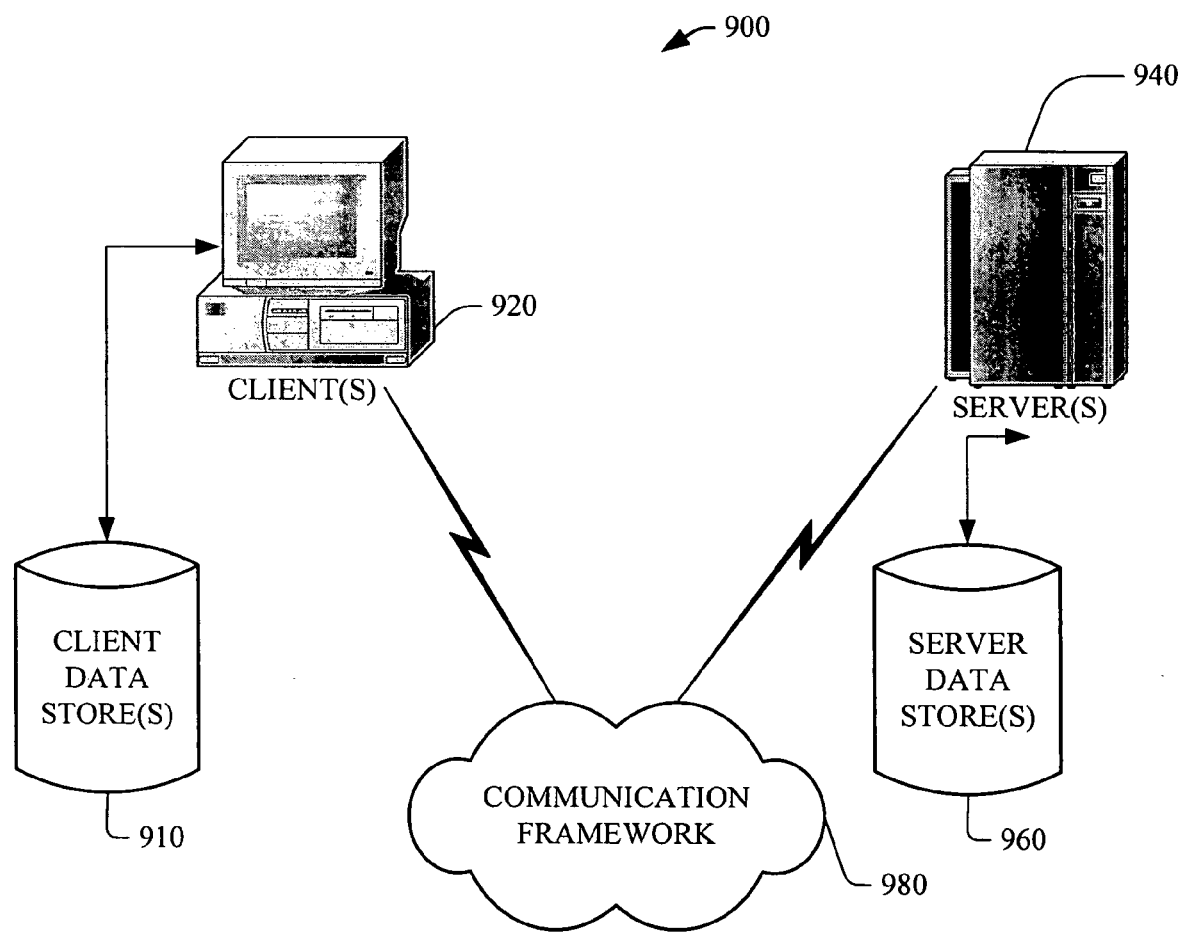
FIG. 9 illustrates a client-server system that can employ a vertical partitioning according to one aspect of the subject invention.

Referring now to FIG. 9, a client-server system 900 that can employ a vertical partitioning according to one aspect of the invention is illustrated. The client(s) 920 can be hardware and/or software (e.g., threads, processes, computing devices). The system 900 also includes one or more server(s) 940. The server(s) 940 can also be hardware and/or software (e.g., threads, processes, computing devices). For example, such servers 940 can house threads to perform transformations by employing the invention. The client 920 and the server 940 can communicate, between two or more computer processes. As illustrated, the system 900 includes a communication framework 980 that can facilitate communications between the client(s) 920 and the server(s) 940. The client(s) 920 is operationally connected to one or more client data store(s) 910 that can store information local to the client(s) 920. Moreover, client 920 can access and update databases 960 located on a server computer 940 running a server process. In one aspect of the invention, the communication frame work 980 can be the internet, with the client process being a Web browser and the server process being a Web server. As such, a typical client 920 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 940 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A computer implemented method of vertical partitioning for a table addressed by a work load comprising:
    analyzing a work load of a table comprised of column referenced queries to determine interesting column-groups;
    selecting candidates for vertical partitioning of the table on a per query basis, wherein each candidate considered is comprised of a first sub-table corresponding to one such interesting column-group and comprised of a second sub-table corresponding to remaining columns in the table, and wherein selection of candidates is restricted to a subset generated via union or intersection of sub-tables; and
    merging the candidates to supply a compromise-between candidate selections, for an optimal split of the table into a plurality of final output sub-tables based on the work load as a whole in terms of joins and redundant data scans, presenting a valid vertical partition in which all columns of the table occur in at least one of the final output sub-tables.

2. The computer implemented method of claim 1 further comprising enumerating the candidates to implement an optimal split for the table.

3. The computer implemented method of claim 1 further comprising employing a measure of effectiveness for a column-group, based on a vertical partitioning confidence (VPC) defined as:

$$\frac{\sum c \in g \; \text{width}\,(c) \cdot |\text{Occurrence}\,(c)|}{\sum c \in g \; \text{width}\,(c) \cdot \left|\bigcup_{c \in g} \text{Occurrence}\,(c)\right|}$$

where c is a column belonging to column-group g, width c is the average width in bytes of c, and Occurrence (c) is set of queries in the work load where c is referenced.

4. The computer implemented method of claim 3 further comprising ranking the interesting column-groups by the VPC.

5. The computer implemented method of claim 1 further comprising measuring an impact of merging on the work load.

6. The computer implemented method of claim 1 further comprising defining a CG–Cost (g) for a column-group g, to designate how interesting the column-group is for the work load.

7. The computer implemented method of claim 6 further comprising designating the column-group as interesting if CG–Cost (g)$\geq$f, where $0 \leq f \leq 1$.

8. The computer implemented method of claim 1 further comprising restricting a space of indexes based on the interesting column groups.

9. The computer implemented method of claim 1 further comprising restricting a space of indexes to at least one of a grouping, ordering, join and selection.

10. The computer implemented method of claim 1 further comprising restricting a space of indexes to columns referenced in the work load.

11. The computer implemented method of claim 5, the merging act further comprises augmenting set of candidates with additional data structures.

12. The computer implemented method of claim 5 further comprising employing a cost function for vertical partitioning based on as a sum of scan cost of data.

13. The computer implemented method of claim 5 further comprising employing a cost function based on a join cost for all queries.

14. The computer implemented method of claim 13 further comprising modeling the join cost as a linear function of individual sub-tables that are joined.

15. The computer implemented method of claim 5 further comprising consulting a query optimizer of an associated database system to select a set of configurations for queries.

16. The computer implemented method of claim 5 further comprising generating relevant physical structure on a per query basis via interesting column-groups that are ranked by a VPC.

17. A computer implemented system that facilitates vertical partitioning for a table comprising:
a column-group restriction component that eliminates a plurality of column-groups based upon a work load of a table comprised of column referenced queries, to identify a group of interesting columns;
a candidate selection component that selects a set of configurations candidates for each query of a the work load in a cost based manner, wherein each candidate considered is comprised of a first sub-table corresponding to one such interesting column-group and comprised of a second sub-table corresponding to remaining columns in the table, and
wherein selection of candidates is restricted to a subset generated via union or intersection of sub-tables; and
a merging component that merges candidates to supply a compromise between candidate selections, for an optimal vertical split of the table into a plurality of final output sub-tables based on the work load as a whole in terms of joins and redundant data scans, presenting a valid vertical partition in which all columns of the table occur in at least one of the final output sub-tables.

18. The computer implemented system of claim 17 further comprising an enumeration component that implements an optimal split for the table.

19. The computer implemented system of claim 17, the candidate selection component consults a query optimizer of an associated database for configuration of each query in a cost-based manner.

20. A computer-implemented system that facilitates vertical partitioning for a table comprising:
means for eliminating a plurality of column-groups, to identify a group of interesting columns;
means for selecting a set of configurations candidates for each query of a work load in a cost based manner, wherein each candidate considered is comprised of a first sub-table corresponding to one such interesting column-group and comprised of a second sub-table corresponding to remaining columns in the table, and wherein selection of candidates is restricted a subset generated via union or intersection of sub-tables; and
means for merging candidates to supply a compromise between candidate selections, for an optimal vertical split of the table into a plurality of final output sub-tables based on the work load as a whole in terms of joins and redundant data scans, presenting a valid vertical partition in which all columns of the table occur in at least one of the final output sub-tables.

\* \* \* \* \*

UNITED STATES PATENT AND TRADEMARK OFFICE
CERTIFICATE OF CORRECTION

| | | |
|---|---|---|
| PATENT NO. | : 7,366,716 B2 | Page 1 of 1 |
| APPLICATION NO. | : 11/124021 | |
| DATED | : April 29, 2008 | |
| INVENTOR(S) | : Sanjay Agrawal et al. | |

It is certified that error appears in the above-identified patent and that said Letters Patent is hereby corrected as shown below:

In column 14, line 12, in Claim 17, before "the" delete "a".

Signed and Sealed this
Twelfth Day of April, 2011

David J. Kappos
*Director of the United States Patent and Trademark Office*